United States Patent [19]

Burrus

[11] 3,875,585

[45] Apr. 1, 1975

[54] CATHODE RAY TUBE FOCUSSING SYSTEM

[75] Inventor: Thomas W. Burrus, Torrance, Calif.

[73] Assignee: The Magnavox Company, Torrance, Calif.

[22] Filed: June 1, 1972

[21] Appl. No.: 258,904

[52] U.S. Cl. ........ 358/44, 178/DIG. 29, 315/31 TV

[51] Int. Cl. ........ H04n 9/06

[58] Field of Search ..... 178/DIG. 29, 5.4 ST, 5.4 R, 178/7.2; 315/31 TV, 31 R

[56] References Cited

UNITED STATES PATENTS

| | | | |
|---|---|---|---|
| 2,472,165 | 6/1949 | Mankin | 178/DIG. 29 |
| 2,964,590 | 12/1960 | Gillete | 178/DIG. 29 |
| 3,084,276 | 4/1963 | Severin | 315/31 TV |
| 3,409,799 | 11/1968 | Kurzweil | 178/DIG. 29 |
| 3,412,281 | 11/1968 | Richards | 315/31 TV |
| 3,506,776 | 4/1970 | Rennick | 178/5.4 SD |
| 3,558,810 | 1/1971 | Cecchin | 178/5.4 SD |
| 3,624,275 | 11/1971 | Lunn | 178/5.4 SD |
| 3,647,952 | 3/1972 | Ball | 178/7.2 |

*Primary Examiner*—Robert L. Richardson
*Attorney, Agent, or Firm*—Thomas A. Briody; William W. Holloway, Jr.

[57] ABSTRACT

This invention relates to a system for focussing a color television camera on a color image. The color television camera produces signal components representing a pair of primary colors and uses these signal components to adjust the focus of the camera so that the camera remains focussed on the color image. Preferably the signal components are modulated so that each of the primary colors can be recorded on a black and white film and so that the color image can be reproduced from the film by detecting the modulations for each primary color.

The focussing system for the television camera includes a focus coil which provides a beam for scanning the image with an optimum focus at a particular value of current in the focus coil. As the focus of the camera varies from the optimum focus, the current in the focus coil decreases from the particular value. This decrease in current in turn produces variations in the characteristics of the signal components produced by the camera to represent the primary colors. The signal components are then processed to produce a control signal having characteristics dependent upon the characteristics of the signal components representing the primary colors. The control signal is then used to vary the current in the focus coil so that the current has the particular value.

Preferably the current in the focus coil is modulated with a signal having a relatively low frequency. This modulation facilitates the production of the control signal from the signal components representing the primary color.

4 Claims, 6 Drawing Figures

CATHODE RAY TUBE FOCUSSING SYSTEM

BACKGROUND OF THE INVENTION

1. Field of the Invention

This invention relates generally to a system for reproducing color images and more particularly to a system for, and method of, focussing a color television camera on a color image so that signal components representing the different primary colors in the color image can be accurately produced by the camera. The system is especially adapted to be used in cameras which produce signal components modulated in a particular relationship to provide for the recording on a black and white film of images representing the different primary colors and to provide for the reproduction of the color image from the recordings on the black and white film.

2. Description of the Prior Art

Various systems are presently employed for reproducing color images. In one such system, the light rays from the color image are processed by a complex camera tube which comprises a separate vidicon tube for each of the primary colors such as red, blue, and green. Although difficult to maintain, the alignment of these vidicon tubes has been of great importance to the reproduction of the color image. These complex camera tubes have been relatively large in size and their complexity has made them relatively expensive to produce.

Various attempts have been made to provide a color reproduction system which employs a camera tube having only a single gun. This would be of advantage since the camera tube having only a single gun can be smaller, easier to produce, less expensive, and relatively free of alignment problems. Various attempts have been made also to provide means for processing the single signal which is produced by a single tube color camera. Although such attempts have been extensive, they have not been particularly successful.

U.S. Pat. No. 3,647,943, issued to Daniel J. Marshall and assigned of record to the assignee of record of this application discloses and claims a system for using a camera tube comprising a single gun to record signals representing the color image. The disclosed color system provides a color modulator which is disposed between the color image and the vidicon tube. The color modulator is provided with lines in a first line pattern which are colored complementary to a first primary color, such as the color red being modulated. The color modulator is also provided with lines disposed in a second line pattern and colored complementary to a second primary color, such as the color blue, being modulated. A third primary color such as the color green can be modulated.

Each of the first and second line patterns is formed from a plurality of parallel, equally spaced lines. The lines in the first line pattern are preferably transverse to the lines in the second pattern so that the image recorded by the camera will include an individual line pattern for each of the colors modulated. In this way, the camera produces signal components modulated in the first line pattern to represent the first primary color such as red and signal components modulated in the second line pattern to represent the second primary color such as blue. The signals in the first line pattern may have a different frequency from the modulations in the second line pattern or may have the same frequency as, but a different phase from, the modulations in the second line pattern. Signal components are also produced by the camera to represent the luminance of the color image. The signal components representing the luminance and the primary colors can be combined to produce a composite signal.

To reproduce the color image, the signal components representing the primary colors are introduced to individual channels on the basis of the frequencies or phases at which they are modulated. The modulations are then detected so that the signal components for each primary color can be recovered. These signal components are then combined with the signal components representing the luminance to reproduce the color image.

The optical focus of the composite image upon the target of the vidicon tube and the electromagnetic focus of the scanning beam are of particular importance to this color reproduction system. Inaccurate or insensitive focussing can result in improper resolution of the composite image and a general loss of the particular colors modulated.

Prior methods for controlling the electromagnetic focus have included means for manually varying the current in the focus coil. These manual means have not been dynamically responsive to variations in the focus and therefore have been relatively unsatisfactory. The focus of the scanning beam has been found to be quite sensitive to changes in such parameters as ambient temperatures and other environmental conditions and to changes in the values of different components in the camera system as a result of variations in such parameters and aging of the different components. The manual correction means of the prior art have been relatively unresponsive to these dynamic changes except perhaps at the very instant of the manual corrections so that the focus of the scanning beam has been less than optimal.

SUMMARY OF THE INVENTION

This invention provides an automatic focussing system which overcomes the foregoing difficulties. The system constituting this invention detects variations in the characteristics of the signals produced by the camera to represent the different color components and uses these variations to regulate the focus of the camera. The system is particularly responsive to variations in the amplitude of the signals representing the color components to regulate the focus provided by the camera. The system is particularly based upon an appreciation that the current through the focussing coil has an optimum value when the camera is focussed and that this current decreases from the optimum value as the camera becomes progressively defocussed.

In the system constituting this invention, the current in the focus coil is preferably modulated at a relatively low frequency so that the color signals produced by the scanning beam contain components which have a phase representing any deviations in the current through the focus coil from an optimum value and have an amplitude representing the magnitude of such deviations. By isolating signal components and detecting their phase and amplitude, a control signal is generated which can be used to bring the current of the focus coil to an optimum value providing for a focus of the image.

The automatic focussing system has a relatively high time constant so that its response is limited to gradual fluctuations in the current through the focus coil. Thus this sytem provides a means for dynamically focussing the scanning beam upon the target in the vidicon tube so that a high degree of resolution is provided in the color reproduction system. Such a system is particularly adapted to be used in the system disclosed and claimed in U.S. Pat. No. 3,647,943.

Further features of the invention will appear from the following description in which the preferred embodiments of the invention have been set forth in detail in conjunction with the accompanying drawings.

DESCRIPTION OF PREFERRED EMBODIMENTS

Figure 1A:
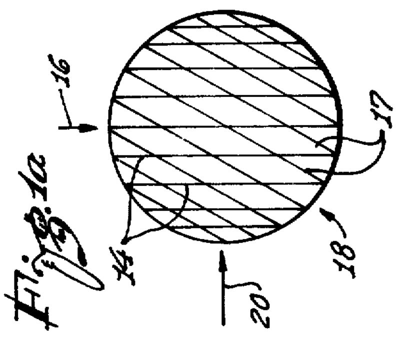
FIG. 1A is a rear elevation of the modulation grating.
Figure 1:
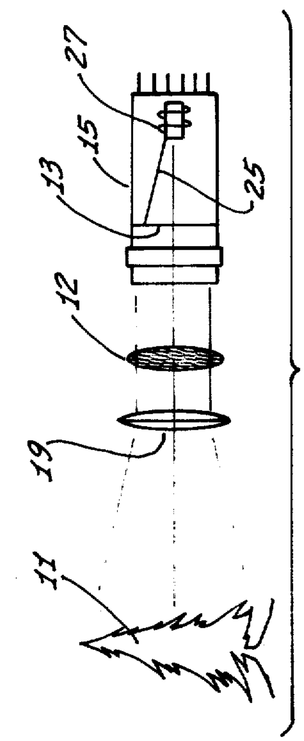
FIG. 1 is an illustration of a color scene projected through a modulation grating onto a vidicon tube of a color television camera.
Figure 2:
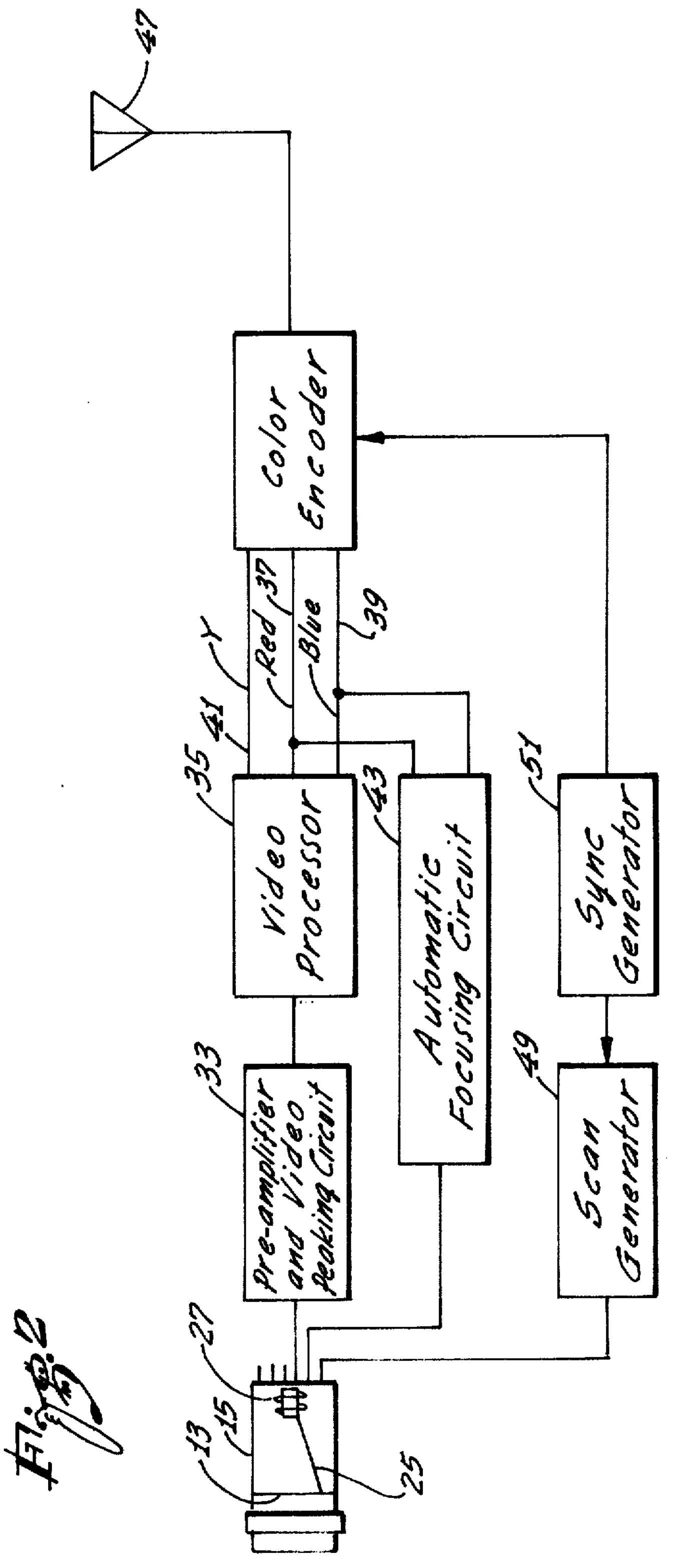
FIG. 2 is a block diagram of the video processing system in the color television camera.

The concept of this invention can be embodied as shown in FIG. 1 wherein the light rays of the color scene 11 are projected by the lens 19 through a modulation grating 12 onto a target 13 of a vidicon tube 15. The lens 19, the modulation grating 12, and the vidicon tube 15 are typically disposed in a television camera (not fully shown). Within the vidicon tube 15, a scanning beam 25 traces the target 13 to develop a signal in accordance with the image on the target. The electromagnetic focus of the scanning beam 25 can be controlled by the use of a focussing coil 27 which preferably envelopes the beam 25.

The modulation grating 12 can include a plurality of first translucent lines 14 forming a first line pattern 16 shown generally in FIG. 1A. The lines 14 can have a color complementary to a first primary color so that the first primary color in the image 11 is modulated in accordance with the first line pattern 16 in the modulation grating 12. For example, in the preferred embodiment the lines 14 in the first line pattern 16 are cyan colored parallel lines and the color red in the image 11 is modulated in a first parallel line pattern.

Similarly the modulation grating 12 can include a plurality of second translucent lines 17 forming a second line pattern 18 different from the first line pattern 16. The lines 17 can have a color complementary to a second primary color so that the second primary color in the image 11 is modulated in accordance with the second line pattern 18 in the modulation grating 12. For example, the lines 17 in the preferred embodiment are yellow colored parallel lines disposed transverse to the lines 14 forming the first line pattern 16. In this embodiment, the primary color blue is modulated in a second parallel line pattern. The light rays corresponding to a third primary color such as green can be unmodulated as they pass through the modulation grating 12.

The modulator first and second primary colors and the luminance containing the unmodulated third primary color in the image 11 can be projected onto the target 13 within the vidicon tube 15. A beam 25 scans the target 13, preferably in a direction transverse to the first and second line patterns 16 and 18, to sense the light projected on the target 13. The beam 25 may be insensitive to color in which case it will detect only the changes in light intensity. Under such circumstances it may be desirable not only to differentiate the color patterns in the image, but also to determine which patterns correspond to which of the primary colors. This can be accomplished by developing an output having signal components each with at least one characteristic differentiating it from the other signal components.

If beam 25 is color blind, it essentially sees a black and white image composed of three patterns two of which are modulated in different line patterns. By demodulating each of the three patterns, the output signal of the television camera can be provided with signal components each of which differs from the other signal component by at least one characteristic.

The modulation of the color patterns can proceed as follows. As the beam 25 scans the first lines 14 projected on the target 13, it senses light as it contacts each of the lines 14 within the pattern of the first primary color. In accordance with the light sensed by the scanning beam 25, the television camera can develop a first signal component representing the first primary color in the image 11. If the beam 25 scans at a substantially constant rate and the lines 14 are equally spaced, the first signal component will have characteristics including a first particular frequency and a first particular phase. The phase of the first signal component will be dependent upon the angle between the direction of the scan and the direction of the first lines 14. For example, in the preferred embodiment the direction of the first lines 14 and the direction of the scan are substantially perpendicular so that a particular one of the lines 14 is sensed at approximately the same time during each of the scans.

In a similar manner, the beam 25 senses light as it contacts each of the lines 17 within the pattern of the second primary color. The lines 17 can be equally spaced so that the beam 25 contacts the lines 17 at a second particular frequency different from the first particular frequency. In response thereto the television camera would develop a second signal component having at least one characteristic, such as frequency, different from the characteristics of the first signal component.

In the preferred embodiment, the lines 17 are spaced so that the scanning beam 25 contacts the lines 17 at the same frequency as it contacts the lines 14. In such an embodiment the characteristic differentiating the first and second signal components can be their phased relationship. The lines 17 can be angularly disposed with respect to the direction of the scan so that in successive scans, the beam 25 will contact a particular one of the lines 17 either earlier or later than it did on the preceding scan line. This will produce a second particular phase different from the first particular phase so that although the first and second signal components may have the same frequencies, they can have different phased relationships. It should be apparent from this analysis that although a single scanning beam 25 may be incapable of differentiating colors in the image 11, the modulating grating 12 provides means for developing signal components each having particular characteristics associated with a particular one of the primary colors in the image. A more detailed description of the modulation and demodulation characteristics of this television system is set forth in U.S. Pat. No. 3,647,943 issued to Daniel T. Marshall.

The signal output from the vidicon tube 15 can be introduced into a preamplifier and video peaking circuit 33 to accentuate the video signal, and after the video signal is amplified it can be separated into its signal components by a video processor 35. These component signals can comprise a red signal on a conductor 37, a blue signal on a conductor 39, and a luminance signal on the conductor 41. The red and blue signals can contain information reflecting the state of the electromagnetic focus of the scanning beam 25. Thus, in the preferred embodiment, these signals provide an input to an automatic focussing network 43 which has characteristics for controlling the magnitude of the current flowing through the focus coil 27.

A color encoder 45 can be provided to encode the signals on conductors 37, 39, and 41 prior to their transmission on an antenna 47. A scan generator 49 and a synchronization generator 51 are provided to control the scanning of the beam 25.

It can be appreciated that the optical focus of the color scene 11 upon the target 13, and the electromagnetic focus of the scanning beam 25 upon the target 13 will have a significant effect upon the resolution of the color reproduction system. The electromagnetic focus of the scanning beam 25 can be correlated with an optimum value of current passing through the focus coil 27. Focus coil currents which are greater or lesser than this optimum value will cause the scanning beam 25 to defocus. It is a purpose of the automatic focussing network 43 to maintain the focus coil current at this optimum value.

Figure 3:
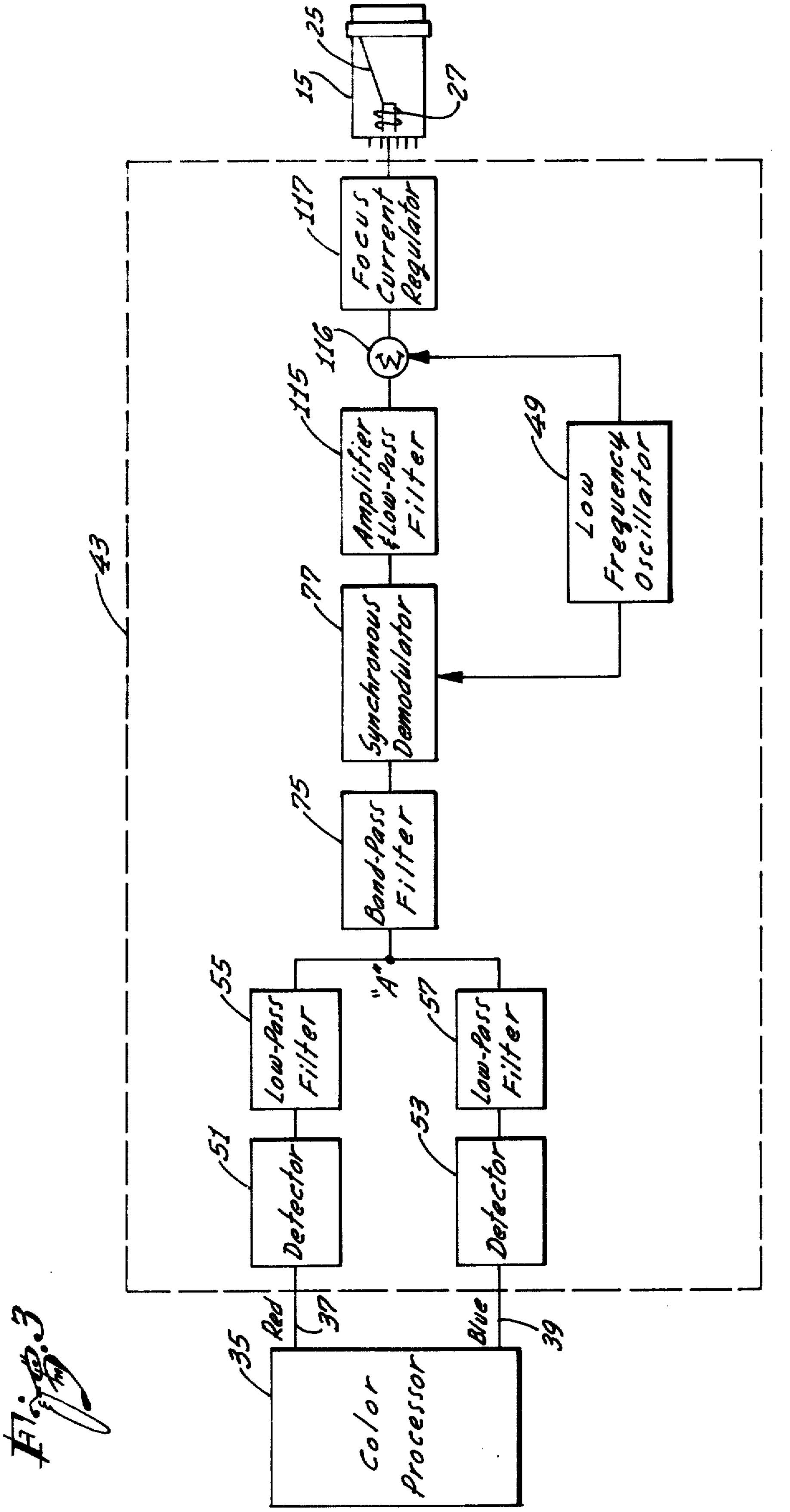
FIG. 3 is a block diagram of the automatic focussing arrangement in the video processing system shown in FIG. 2.

The automatic focussing network 43 is shown in greater detail in FIG. 3 wherein a low frequency oscillator 49 is provided to modulate the current passing through the focus coil 27. These low frequency modulations can cause the focus of the scanning beam 25 to vary slightly so that the red and blue signals contain components at the low frequency which reflect the intensity of the focus coil current. In the preferred embodiment the focus coil current is modulated at a frequency of 10 hertz.

The red and blue video signals on conductors 37 and 39 can be amplitude modulated on a carrier of 3.58 megahertz and detected in the detectors 51 and 53 to provide video signals having high frequency components including video information and low frequency components including focus coil current information. The signals respectively representing the red and blue colors can then be fed through lowpass filters 55 and 57 to filter out the high frequency component so that only the low frequency information is passed. The low frequency information constitutes the carrier signals of 10 hertz having an amplitude and phase representing the focussing of the color image at each instant. The low frequency information in each of the signals is then summed at a Point A.

Figure 4:
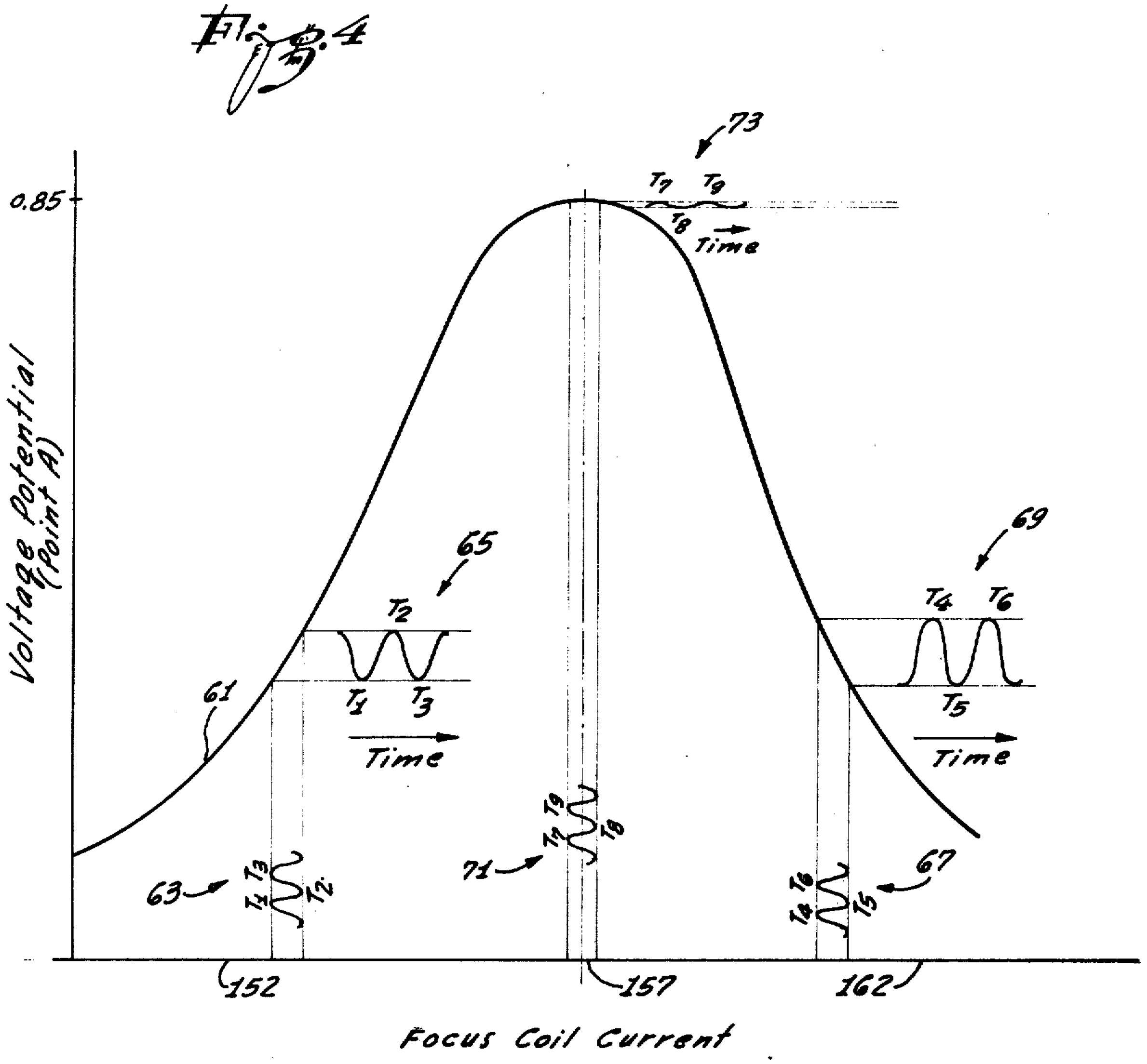
FIG. 4 is a curve illustrating the response of the system shown in FIG. 3 to focussing currents of different amplitudes and phase.

With a fixed color scene 11 and optimum optical focus, the potential at Point A can be plotted against the current in the vidicon focus coil to provide a transfer function such as that shown in FIG. 4. The transfer function is substantially bell shaped with the optimum value of focus coil current located at the apex of the bell. In the preferred embodiment, this optimum focus coil current is approximately 157 milliamps. The voltage potential at Point A will achieve its greatest amplitude at this optimum focus coil current. Values of current greater or less than the optimum focus coil current provide decreased values in the amplitude of the voltage at Point A. Thus, the amplitude of the voltage at Point A is indicative of any deviations in the focus of the scanning beam 25 from an optimum value.

To detect the focus status, the focus coil current can be sine wave modulated and can have a relatively low amplitude, such as 0.0555 milliamps peak to peak, so that no visible jitter can be seen at any focus current level. As previously mentioned, the frequency of the low frequency oscillation is preferably 10 hertz.

The modulations of the focus coil current can provide corresponding modulations in the voltage potential at Point A as shown in FIG. 4. It is significant to note, however, that the modulations 67 at 10 hertz of a focus coil current greater than the optimum current value of approximately 157 milliamperes will provide Point A voltage modulations 69 which are in phase with the current modulations. In contradistinction, modulations 63 at 10 hertz of a focus coil current less than the optimum current value of approximately 157 milliamperes will provide Point A voltage modulations 65 which are out of phase with the current modulations. Thus, the phase relationship of the modulating current and the voltage at Point A can provide an indication as to the direction of any deviation of the actual focus coil current from the optimum current value. These phase relationships are relied upon in the present invention to provide an appropriate increase or decrease in the focus coil current so that the optimum value can be maintained.

It is also apparent that the amplitude of the modulated signal at Point A provides an indication of the extent to which the actual focus coil current has deviated from the optimum value. Thus, a modulated focus coil current 71 at the optimum value of 157 milliamps provides at Point A a signal 73 having a relatively low amplitude. In contradistinction, the modulated focus coil currents 63 and 67 having respective current values less than and greater than the optimum value of approximately 157 milliamperes, provide at Point A the signals 65 and 69, respectively, having a relatively high amplitude. As the deviation from the optimum focus coil current of approximately 157 milliamperes increases through a particular range, the amplitude of the signals such as the signals 65 and 69 become correspondingly increased.

The signal produced at Point A can be introduced into an active bandpass filter 75. In the preferred embodiment, this filter 75 blocks the d-c component of the potential at Point A and amplifies the 10 hertz component. The bandpass filter 75 can have a bandwidth of approximately 1 hertz and can provide a phase shift of 180° at its center frequency.

The output of the bandpass filter 75 is fed to a synchronous demodulator 77. The synchronous demodulator 77 senses the magnitude of the signal of Point A and also its phase relationship with respect to the reference signal generated by the low frequency oscillator 49. A correcting voltage can then be developed from the signal produced by the demodulator 77 to provide either an increase or decrease in the focus coil current and thereby bring it to the optimum value. This correction voltage is developed by the demodulator 77 in accordance with the discussion above with respect to the curve shown in FIG. 4.

The synchronous demodulator 77 operates by mixing the signals from the filter 75 with the signals from the low frequency oscillator 49. The low frequency oscillator 49 can be of a phase shift type developing both sine and square wave signals 180° out of phase. The square wave signal can be used as the reference signal in the synchronous demodulator 77. The sine wave signal is introduced to a mixer 116 which mixes these signals with the correction voltage produced by the demodulator 77 and passed through an amplifier and lowpass filter 115 which operates to pass only the variations in the correction voltage while preventing the passage of any modulating signals at 10 hertz. The signals produced in the adder 116 are then introduced to a regulator 117 for controlling the value of the focussing current subsequently produced in the focussing coil 27.

Figure 5:
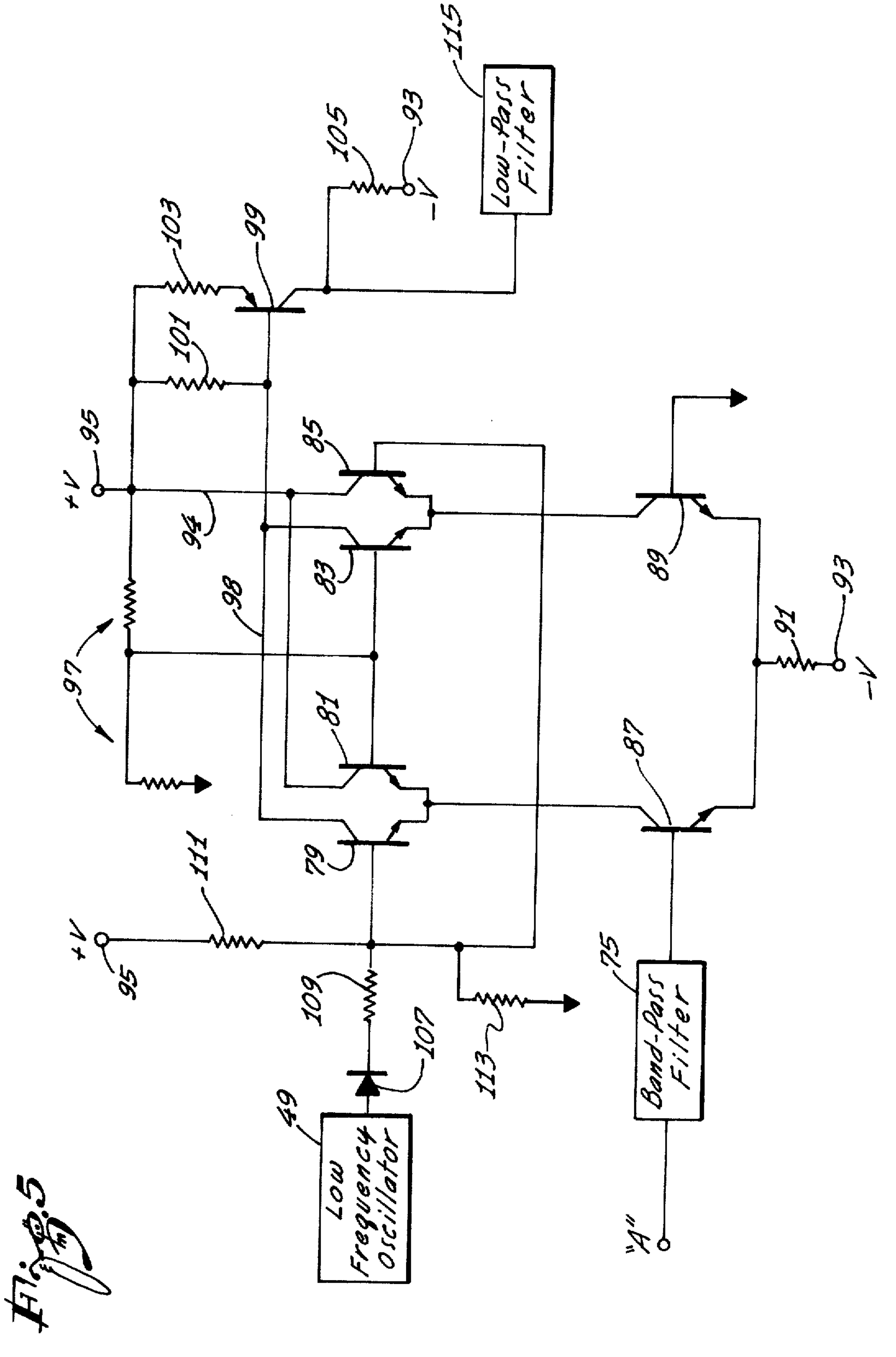
FIG. 5 is a schematic diagram of a synchronous demodulator which is in the automatic focussing arrangement shown in FIG. 3.

The synchronous demodulator 77 can comprise an integrated circuit such as shown in FIG. 5 and formed from pairs of balanced current-emitting devices. Such an integrated circuit can be that manufactured by RCA Semiconductor and sold generally under the catalog No. CA3026. A first pair of current-emitting devices may comprise transistors 79 and 81, a second pair may comprise transistors 83 and 85, and a third pair may comprise transistors 87 and 89. The emitters of the first pair of transistors 79 and 81 may be connected to the collector of the transistor 87 and the emitters of the second pair of transistors 83 and 85 may be connected to the collector of the transistor 89. The emitters of the third pair of transistors 87 and 89 may be connected through a resistor 91 to a source of negative operating potential 93 such as −12 volts. The collectors of the transistors 81 and 85 may be connected to the source of positive operating potential 95 such as +12 volts.

The source of positive operating potential 95 may be divided in a voltage divider shown generally at 97 to provide an appropriate bias on the bases of the transistor 81 and 83. In the preferred embodiment this bias voltage +6 volts. The collectors of the transistors 79 and 83 are connected to the base of a transistor 99 and through a resistor 101 to the source of positive operating potential 95. A resistance means 103 is also connected from the source of operating potential 95 to the emitter of the transistor 99. The collector of the transistor 99 is connected through a resistance means 105 to the source of negative operating potential 93. The voltage on the collector of the transistor 99 provides the output of the synchronous demodulator.

As noted a square wave reference signal is provided by the low frequency oscillator 49. This signal is passed through a diode 107 and a resistance means 109 and presented to the bases of the transistors 79 and 85. This square wave signal can be biased at a particular potential by a pair of resistors 111 and 113 which are connected respectively to the source of positive operating potential 95 and ground.

The signal at Point A is filtered and inverted by the bandpass filter 75 so that only the signal at 10 hertz is passed, and this signal is presented to the base of transistor 87. The base of transistor 89 is connected to a reference potential such as ground.

It can be appreciated that the current in the conductor 98 will affect the voltage on the collector of the transistor 99 while the current on the conductor 94 will have substantially no effect on the output voltage as its passes between the sources of operating potential 93 and 95. It is the function of the transistors 79, 81, 83, and 85 to provide direct currents on the conductors 94 and 98 in response to the alternating current signal received from the low frequency oscillator 49. It is the function of the transistors 87 and 89 to divide the currents on the conductors 94 and 98 in accordance with the relationship between the amplitude and phase of the Point A signal and the amplitude and phase of the reference signal. These functions are accomplished in the following manner.

The square wave signal provided by the low frequency oscillator 49 and introduced to the transistors 79 and 85 in the synchronous demodulator 43 varies between positive values of 5 and 7 volts in the preferred embodiment. When the signal is at the most positive half of its cycle, a positive 7 volts is presented to the bases of transistors 79 and 85. Since the bases of the transistors 81 and 83 are held at a substantially constant 6 volts as a result of the action of the voltage divider 97, the transistors 79 and 85 conduct while the transistors 81 and 83 are shut off. Thus, in the positive half of the square wave signal, the transistor 85 provides an input to the conductor 94 and the transistor 79 provides an input to the conductor 98.

In the negative half of the square wave signal from the oscillator 49, the bases of the transistors 79 and 85 will be provided with a potential of +5 volts. Since the bases of the transistors 81 and 83 are held at a substantially constant potential of +6 volts, the transistors 81 and 83 will conduct while the transistors 79 and 85 will be shut off. Thus, in the negative half of the square wave signal, the transistor 81 provides an input to the conductor 94 and the transistor 83 provides an input to the conductor 98.

The amount of current flowing on the conductors 92 and 98 will depend upon the bias provided on the transistors 87 and 89 by the inverted Point A signal emanating from the passband filter 75. When the inverted Point A signal is positive, the transistor 87 will conduct to a greater extent than will the transistor 89 since the forward bias is greater on the transistor 87. However, during the negative portion of the cycle, the transistor 89 will conduct to a greater extent than the transistor 87 since the forward bias on the transistor 87 will be less than the forward bias on the transistor 89. The relative division of the currents between the transistors 87 and 89 depends upon the amplitude of the signal passing through the filter 75. However, the total sum of the currents flowing through the transistors 87 and 89 is substantially constant if the transistors are inclined in a differential amplifier.

It will be noted that, if the inverted Point A signal passing through the filter 75 is in phase with the square wave signal from the oscillator 49, the transistor 87 will be conducting to a greater extent than the transistor 89 at the same time the transistors 79 and 85 are conducting.

If the inverted Point A signal and the reference signal are out of phase, the transistors 81 and 83 will be conductive during the time that the current in the transistor 87 exceeds the current in the transistor 89. This will cause the current in the conductor 98 to be less than the current in conductor 94. In the other half cycles, the transistors 79 and 85 will be conducting during the time that the current in the transistor 89 exceeds the current in the transistor 87. This will also cause the current in the conductor 98 to be less than the current in the conductor 94.

Thus, although the sum of the current flowing through the two conductors 94 and 98 is substantially constant, the relative current flowing through each of these conductors 94 and 98 will be dependent upon the phase relationship of the signals from the oscillator 49 and the filter 75. However, only the current passing through the conductor 98 directly affects the output voltage of the synchronous demodulator 77.

The current in the conductor 98 will pass through the resistor 101 to the source of positive operating potential 95. The greater the current in the conductor 98 the more negative will be the voltage on the base of transistor 99. This more negative voltage on the base of transistor 99 can cause a greater current to flow through the resistor 105 so that the collector of the transistor 99 can become less negative. In contradistinction, a lesser current in the conductor 98 will cause the voltage at the collector of transistor 99 to become more negative. Thus, a more negative voltage on the transistor 99 corresponds to an out-of-phase relationship between the inverted Point A signal and the reference signal.

The output of the synchronous demodulator 77 is amplified and introduced to a lowpass filter 115. The lowpass filter 115 removes the harmonics from the demodulator output leaving only the d-c average present in the output of the synchronous demodulator 77. The lowpass filter 115 can be connected so that a negative tending input signal will provide a positive tending output signal. It is this output signal which is modulated by the 10 hertz signal developed in the low frequency oscillator 49. The lowpass filter 115 is provided with a time constant of approximately 34 seconds in the preferred embodiment. This assures that the automatic focussing network 43 is responsive only to gradual changes in the focus coil current. Thus, although the red and blue signals may not be present for a period of time, the focus of the scanning beam 25 can be maintained.

The modulated output signal of the lowpass filter 115 can be presented to a focus current regulator 177 wherein a positive tending voltage will decrease the focus coil current. Thus, in the preferred embodiment, a modulated focus coil current greater than the optimum value creates a signal at Point A which is out of phase with the modulating signal. The square wave signal from the low frequency oscillator 49 is similarly out of phase with the modulating signal so that the reference signal and the inverted Point A signal introduced to the synchronous demodulator 77 are out of glass. This results in a negative tending voltage at the output of the synchronous demodulator 77 and a positive tending voltage at the output of the lowpass filter 115. In the focus current regulator 117, this positive tending voltage from the lowpass filter 115 results in a desired decrease in the focus coil current.

Although the automatic focussing system has been explained with reference to a television camera having a single vidicon tube 15, it can be appreciated that the system is equally advantageous for automatically focussing the scanning beams 25 in those television cameras having more than one vidicon tube. As noted, the electromagnetic focus of the scanning beam in the camera tube 15 is particularly critical if the reproduction system is to be responsive to the detail in a color scene. Prior art means for manually varying the focus coil current have not been dynamically responsive to time, temperature, and other environment excesses which tend to defocus the scanning beam. The system as disclosed herein provides a bell shaped transfer function the apex of which corresponds to the optimum focus of the scanning beam. Means responsive to voltage variations from the apex provide corrections to bring the current to its optimum value. In this manner the focus of the scanning beam can be automatically and dynamically maintained.

While the present invention has been shown and described in what are conceived to be the most practical and preferred embodiments, it is recongnized that departures may be made therefrom within the scope of the invention, which is therefore not to be limited to the details disclosed herein.

I claim:

1. In combination for reproducing a color image:

first means for scanning the color image to produce signals representing a first and a second primary colors and a signal representing the luminance in the color image, the signals representing the first and second primary color having substantially the same frequency with differing phase, the first means including second means for focussing the first means on the color image during the scanning of the color image, wherein the first means provides a scanning beam and the second means includes a focus coil disposed relative to the scanning beam for producing a current to maintain the focus of the beam;

third means responsive to the signals representing the first and second primary colors for producing a low frequency control signal having characteristics dependent upon the characteristics of the signals representing the first and second primary colors, wherein the third means is reponsive to the current in the focus coil to provide the control signal with characteristics dependent upon this current; and fourth means reponsive to the control signal for adjusting the focus provided by the first means in accordance with the characteristics of the control signal, the fourth means varying the current in the focus coil in accordance with the characteristics of the control signal, wherein the fourth means comprises:

first and second matched current controlling devices connected to each other at a first common terminal;

third and fourth matched current controlling devices connected to each other at a second common terminal;

the first and fourth current controlling devices connected to a reference signal and biased to conduct when the reference signal is positive;

the second and third current controlling devices connected to a source of operating potential and biased to conduct when the reference signal is negative;

fifth means having characteristics for dividing the conducted current between the first and second current controlling devices and the third and fourth current controlling devices in accordance with the phase of a particular voltage so that the magnitude of the correction current reflects the magnitude and direction of the focus coil current from the optimum value; wherein the current conducted through the first, second, third and fourth current controlling devices remains substantially constant and the current conducted by the first and third current controlling devices is the correction current.

2. A combination as recited in claim 1 wherein the fourth means further comprises:

a source of negative operating potential;

fifth and sixth matched current controlling devices connected to each other at the source of negative operating potential;

the fifth current controlling device connected to the first common terminal and biased by the particular voltage;

the sixth current controlling device connected to the second common terminal and biased by a referece potential such as ground; whereby the fifth current controlling device will conduct to a greater extent when the particular voltage is positive and the sixth current controlling device will conduct to a greater extent when the particular voltage is negative.

3. In combination for maintaining the electromagnetic focussing for a scanning beam in a color television camera tube:

a focus coil disposed relative to the scanning beam for producing a current to produce a focus of the beam wherein the optimum focus corresponds to an optimum value for the focus coil current;

means responsive to a first output signal from the color camera tube for producing a first control signal, the first output signal having characteristics dependent upon the characteristics of the focus current and a first primary color of an image;

means responsive to a second output signal of the specified frequency from the color camera tube for producing a second control signal, the second output signal having characteristics dependent upon the characteristics of the focus current and a second primary color of the image, wherein a phase of the second output signal differs from a phase of the first output signal, wherein the means for providing the first and the second control signals includes:

means for providing a reference signal;

means for modulating the current in the focus coil with the reference signal to modulate the first and the second output signal, the modulated output signal having a phase dependent upon the direction of deviation of the current of the focus coil from the optimum value and having a magnitude dependent upon the magnitude of the deviation of the current in the focus coil from the optimum value, and means responsive to the first control signal and the second control signal for adjusting the current in the focus coil to maintain the focus current at the optimum value, the current adjusting means responding to the phase and amplitude of the modulated signal to adjust the current in the focussing coil to the optimum value, wherein the means for providing focus current adjustment comprises:

a first conductor connected to the resistance means for transmitting the current adjustment thereto;

a second conductor connected to the source of positive operating potential;

a first pair of balanced current-controlling devices such as a second and third current-controlling device is also connected to the first conductor and the third current-controlling device is also connected to the second conductor;

a second pair of balanced current-controlling devices such as a fourth and fifth current-controlling device connected to each other wherein the fourth current-controlling device is also connected to the first conductor and the fifth current-controlling device is also connected to the second conductor;

the second and fifth current-controlling devices commonly biased by the reference signal;

the third and fourth current-controlling devices commonly biased by the source of positive operating potential; wherein the second and fifth current-contolling devices conduct when the reference signal is positive and the third and fourth current-controlling devices conduct when the reference signal is negative and the conducted current is correspondingly enabled in the first and second conductors;

means connected to the common terminals of the first and second pairs and responsive to a particular voltage signal for dividing the current between a particular current-controlling devices which are conducted in accordance with the phase of the particular voltage; whereby a greater current will flow in the first current path if the particular voltage signal and the reference signal are in phase than if they are out of phase.

4. The combination as defined in claim 3 wherein the division means comprises:

the third pair of balanced current-controlling devices such as a sixth and seventh current-controlling device is also connected to the common terminal of the second pair;

the common terminal of the third current-controlling device pair is connected to the source of negative operating potential; the sixth current-controlling device is biased in part by the particular voltage signal and the seventh current-controlling device in part by the reference potential such as ground; and the sixth and seventh means having characteristics for conducting simultaneously in relative magnitudes corresponding to the instantaneous voltage of the particular voltage signal.

* * * * *